United States Patent
Liu et al.

(10) Patent No.: US 11,307,671 B2
(45) Date of Patent: Apr. 19, 2022

(54) CONTROLLER FOR FINGER GESTURE RECOGNITION AND METHOD FOR RECOGNIZING FINGER GESTURE

(71) Applicant: HTC CORPORATION, Taoyuan (TW)

(72) Inventors: Wan-Hsieh Liu, Taoyuan (TW); Chou-Wei Wu, Taoyuan (TW); Wei-Gang Tsai, Taoyuan (TW); Chih-Ting Chen, Taoyuan (TW)

(73) Assignee: HTC CORPORATION, Taoyuan (TW)

( * ) Notice: Subject to any disclaimer, the term of this patent is extended or adjusted under 35 U.S.C. 154(b) by 0 days.

(21) Appl. No.: 17/154,074

(22) Filed: Jan. 21, 2021

(65) Prior Publication Data

US 2021/0141461 A1    May 13, 2021

Related U.S. Application Data

(62) Division of application No. 16/737,470, filed on Jan. 8, 2020, now Pat. No. 10,996,765, which is a division
(Continued)

(51) Int. Cl.
*G06F 3/01* (2006.01)
*A63F 13/218* (2014.01)
(Continued)

(52) U.S. Cl.
CPC .......... *G06F 3/017* (2013.01); *A63F 13/212* (2014.09); *A63F 13/214* (2014.09);
(Continued)

(58) Field of Classification Search
CPC .................................. A63F 13/02; G06F 1/32
See application file for complete search history.

(56) References Cited

U.S. PATENT DOCUMENTS

| 6,724,366 B2 | 4/2004 | Crawford |
| 7,931,535 B2 | 4/2011 | Ikeda et al. |

(Continued)

FOREIGN PATENT DOCUMENTS

| CN | 104162274 A | 11/2014 |
| CN | 205427764 U | 8/2016 |

(Continued)

OTHER PUBLICATIONS

Chinese language office action dated Oct. 25, 2021, issued in application No. TW 107140830.
(Continued)

*Primary Examiner* — Joseph R Haley
(74) *Attorney, Agent, or Firm* — McClure, Qualey & Rodack, LLP

(57) ABSTRACT

A method for recognizing finger gesture, operating by receiving a signal of finger movement from a controller, wherein the controller includes a plurality of finger sensors, and the signal of finger movement is generated by at least one of the finger sensors sensing that at least one of fingers of a user touches or approaches the controller, defining a range of the controller that is touched by the fingers according to the signal of finger movement, and suspending operation of the finger sensors outside of the range, and determining a finger gesture constituted by the fingers according to the signal of finger movement to generate a signal of finger gesture corresponding to the finger gesture.

13 Claims, 10 Drawing Sheets

Related U.S. Application Data of application No. 15/826,365, filed on Nov. 29, 2017, now Pat. No. 10,579,151.

(60) Provisional application No. 62/441,982, filed on Jan. 4, 2017.

(51) Int. Cl.
*A63F 13/212* (2014.01)
*A63F 13/245* (2014.01)
*A63F 13/28* (2014.01)
*A63F 13/42* (2014.01)
*A63F 13/214* (2014.01)

(52) U.S. Cl.
CPC .......... *A63F 13/218* (2014.09); *A63F 13/245* (2014.09); *A63F 13/28* (2014.09); *A63F 13/42* (2014.09); *G06F 3/011* (2013.01); *G06F 3/014* (2013.01)

(56) References Cited

U.S. PATENT DOCUMENTS

| | | |
|---|---|---|
| 8,323,106 B2 | 12/2012 | Zalewski |
| 8,373,653 B2 | 2/2013 | Urbach |
| 8,730,155 B2 | 5/2014 | Araki et al. |
| 9,210,359 B2 | 12/2015 | Kim et al. |
| 10,310,733 B2 * | 6/2019 | Kim ............... G06F 3/041662 |
| 2005/0030285 A1 | 2/2005 | Fu |
| 2005/0275625 A1 | 12/2005 | Koenig |
| 2008/0293491 A1 | 11/2008 | Wu et al. |
| 2009/0021481 A1 | 1/2009 | Urbach |
| 2013/0093692 A1 | 4/2013 | Wang et al. |
| 2014/0111690 A1 | 4/2014 | Kim et al. |
| 2015/0022446 A1 | 1/2015 | Asplund |
| 2019/0025916 A1 | 1/2019 | Okumura et al. |

FOREIGN PATENT DOCUMENTS

| | | |
|---|---|---|
| CN | 103826146 B | 3/2019 |
| TW | 200709831 A | 3/2007 |
| TW | 200846061 A | 12/2008 |
| TW | 201109068 A | 3/2011 |
| TW | 201219093 A | 5/2012 |
| TW | 201316211 A | 4/2013 |
| TW | 201635098 A | 10/2016 |
| WO | 2016140924 A1 | 9/2016 |

OTHER PUBLICATIONS

English language translation of office action dated Oct. 25, 2021, issued in application No. TW 107140830.

Office Action issued in corresponding Taiwan application No. 106142204 dated Apr. 16, 2018.

Office Action issued in corresponding German application No. 102018100122.3 dated May 30, 2018.

Office Action issued in corresponding Chinese application No. 201711334136.6, and its translation.

* cited by examiner

CONTROLLER FOR FINGER GESTURE RECOGNITION AND METHOD FOR RECOGNIZING FINGER GESTURE

CROSS-REFERENCES TO RELATED APPLICATIONS

This application is a Divisional of U.S. patent application Ser. No. 16/737,470, filed on Jan. 8, 2020, which is a Divisional of U.S. patent application Ser. No. 15/826,365, filed on Nov. 29, 2017 (now U.S. Pat. No. 10,579,151, issued on Mar. 3, 2020) which claims priority to U.S. Patent Application No. 62/441,982 filed on Jan. 4, 2017, which is hereby incorporated by reference in its entirety.

BACKGROUND OF THE INVENTION

Field of the Invention

The present invention relates to a controller for finger gesture recognition and a method for recognizing finger gesture.

Descriptions of the Related Art

In virtual reality (VR) experiences (e.g., games or education), body movements of users may be detected by several action sensors and then synchronously expressed in stereoscopic images of virtual reality, thereby providing the users with immersive experiences in which the users feel as if they are in the virtual reality by themselves. Most of action detectors used in the VR equipments currently available detect main actions of the users, e.g., movement and turning of heads, movement and swing of hands or arms or the like.

If fine actions, e.g., actions of fingers, of the users can be further detected and synchronously expressed in the virtual images, the users can be provided with better immersive experiences. A technology for providing action sensors in a glove is available currently, and actions of fingers can be detected after the user puts on the glove. However, the user will certainly feel troublesome and hot when wearing the glove, and moreover, it is hard for the glove to suit hands of different sizes of different users because the size of the glove is fixed.

SUMMARY OF THE INVENTION

An objective of the present invention is to provide a controller for finger gesture recognition and a method for recognizing finger gesture, which determine a finger gesture of a user by sensing whether a finger of the user touches or approaches the controller. Another objective of the present invention is that the controller and the method can suit users with hands of different sizes to determine the finger gesture thereof. Yet a further objective of the present invention is that the finger gesture of the user determined by the controller and the method may be applied to interactive applications such as the virtual reality or the like.

To achieve the aforesaid objectives, a controller provided by the present invention comprises: a griping body, comprising a head portion and a griping portion which is disposed opposite to the head portion and comprises a plurality of finger contact areas; a manipulating component, disposed on the head portion; and a sensing component, comprising a plurality of finger sensors which are disposed in the finger contact areas of the griping portion respectively.

In an embodiment, the griping body further comprises an attaching portion which includes a top end and a bottom end disposed opposite to the top end, wherein the top end connects to the head portion and/or the bottom end connects to the griping portion.

In an embodiment, the sensing component further comprises a vital sensor which is disposed on the attaching portion.

In an embodiment, the griping portion comprises a receiving area and a lid, the finger sensors are disposed in the receiving area, and the lid covers the receiving area and the finger sensors.

In an embodiment, the lid comprises a plurality of openings, and positions of the openings correspond to positions of the finger sensors respectively.

In an embodiment, each of the finger sensors comprises a proximity sensing element, a capacitive touch-sensing element, a resistive touch-sensing element, an inductive touch-sensing element, a pressure sensing element, or an optical touch-sensing element.

In an embodiment, the finger contact areas include a middle finger contact area, a ring finger contact area and a little finger contact area, each of which corresponds to at least one of the finger sensors.

In an embodiment, each of the ring finger contact area and the little finger contact area corresponds to at least two of the finger sensors.

In an embodiment, the finger contact areas further comprise an index finger contact area which corresponds to at least one of the finger sensors.

In an embodiment, the head portion further comprises a thumb contact area which corresponds to at least one of the finger sensors.

To achieve the aforesaid objectives, a method for recognizing finger gesture comprises the following steps: receiving a signal of finger movement from a controller, wherein the controller includes a plurality of finger sensors, and the signal of finger movement is generated by at least one of the finger sensors sensing that at least one of fingers of a user touches or approaches the controller; and determining a finger gesture constituted by the fingers according to the signal of finger movement to generate a signal of finger gesture corresponding to the finger gesture.

In an embodiment, the signal of finger movement is generated by at least one of the finger sensors sensing that at least one of the fingers leaves from the controller.

In an embodiment, a range of the controller that is touched by the fingers is defined according to the signal of finger movement.

In an embodiment, operation of the finger sensors outside of the range is suspended.

In an embodiment, the signal of finger movement comprises a first signal, a second signal, and a third signal which are respectively generated by one or more of the finger sensors sensing that one of a middle finger, a ring finger and a little finger of the fingers touches or approaches the controller.

In an embodiment, the signal of finger movement comprises a fourth signal which is generated by one or more of the finger sensors sensing that an index finger of the fingers touches or approaches the controller.

In an embodiment, the signal of finger movement comprises a fifth signal which is generated by one or more of the finger sensors sensing that a thumb of the fingers touches or approaches the controller.

In an embodiment, a vital signal is received from the controller, wherein the controller comprises a vital sensor, and the vital signal is generated by the vital sensor sensing a back of hand of the user.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Figure 1A:
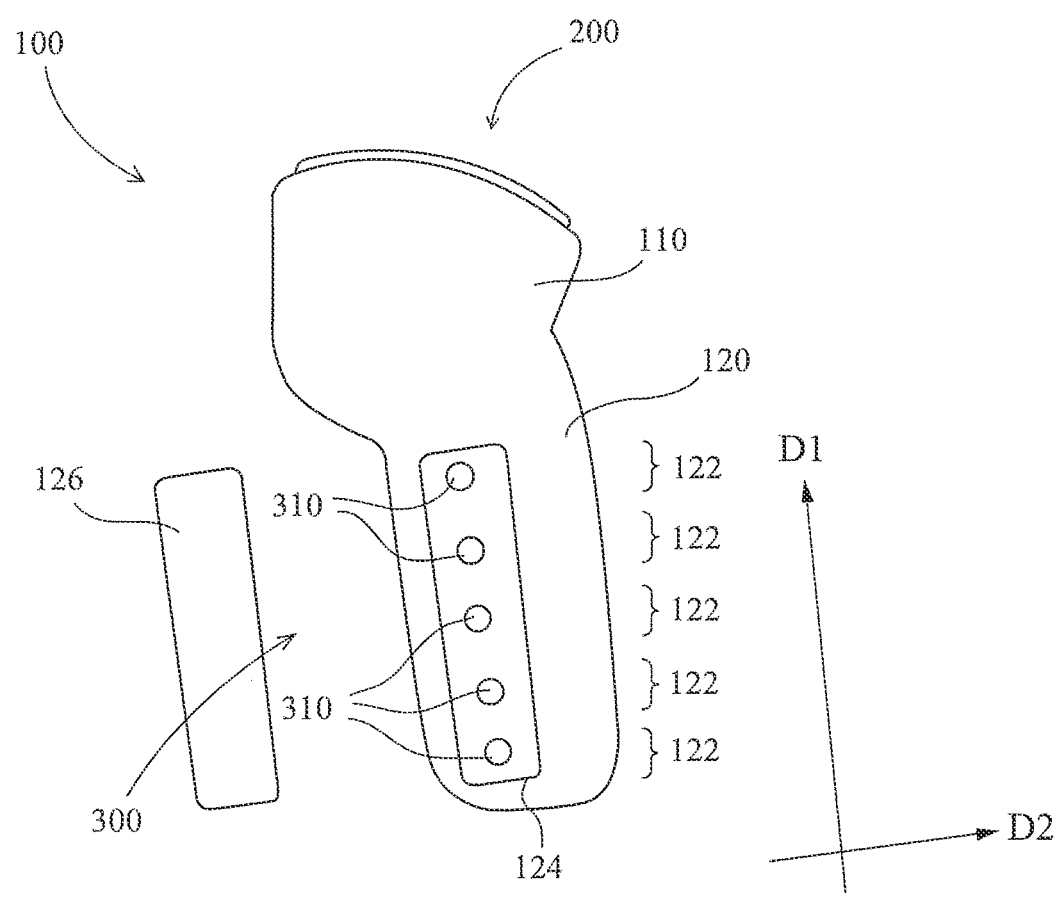
FIG. 1A is a perspective view of a controller according to a first preferred embodiment of the present invention.

Please refer to FIG. 1A, which is a perspective view of a controller 10 according to a first preferred embodiment of the present invention. The controller 10 may be used in combination with a VR providing device (which is not shown but may comprise a combination of a head-mounted display and a host), wherein the finger movement of the user can be detected by the controller 10, and then the providing device presents a corresponding image and executes a corresponding instruction synchronously according to the finger gesture being detected. The controller 10 may also be used in combination with a game host (not shown). Moreover, the controller 10 may also implement a technology of sensing actions such as the rotation and movement of a hand of a user or the like, and the implementation of such a technology shall be known in the art and thus will not be further described herein.

The controller 10 may comprise a griping body 100, a manipulating component 200 and a sensing component 300, and technical contents of each of these elements will be described in sequence as follows.

The griping body 100 structurally comprises a head portion 110 and a griping portion 120 which is disposed opposite to the head portion 110, the manipulating component 200 is at least disposed on the head portion 110, and the sensing component 300 is at least disposed on the griping portion 120. More specifically, the head portion 110 is shorter and the griping portion 120 is longer, as measured in a first direction D1; and the head portion 110 is wider and the griping portion 120 is narrower, as measured in a second direction D2 (which is perpendicular to the first direction). Through such a size configuration, it is easy for a thumb and a first web of the user to fasten the head portion 110 and remaining four fingers to grip the griping portion 120 when the griping body 100 is griped by the user. The thumb may manipulate the manipulating component 200 on the head portion 110, the middle finger, the ring finger and the little finger may touch the griping portion 120, and the index finger may selectively manipulate the manipulating component 200 or touch the griping portion 120. Moreover, the griping body 100 does not cover the fingers of the user when it is griped by the user, so the user can grip or release the griping body 100 easily and rapidly.

The griping portion 120 further comprises a plurality of finger contact areas 122, which are areas on the external surface of the griping portion 120 that can be touched by fingers of the user when the user bends the fingers. Different users have hands (including palms and fingers) of different sizes, so positions on the external surface of the griping portion 120 that can be touched by the fingers are also different. The finger contact areas 122 may be defined as corresponding to areas that might be touched by fingers of a plurality of users instead of corresponding to the size of a hand of a single user. In this embodiment, the finger contact regions 122 may be arranged in the first direction D1 to define a strip area. Moreover, the head portion 110 may also comprise finger contact areas (not shown) to correspond to touch of the thumb and the index finger.

The manipulating component 200 is disposed on the head portion 110 so that the user inputs a control signal to the VR providing device by operating the manipulating component 200. The manipulating component 200 may comprise elements such as a button, a knob, a rocker and/or a touch panel, thereby providing the user with diversified manipulating modes. The manipulating component 200 not only can be disposed on the head portion 110, but also can be disposed on the griping portion 120 at a position outside the finger contact areas 122 (e.g., in a second embodiment shown in FIG. 7 described later).

The sensing component 300 may comprise a plurality of finger sensors 310 which are disposed in the finger contact areas 122 of the griping portion 120 respectively (which may also be disposed in the finger contact areas of the head portion 110). Each of the finger contact areas 122 may be provided with one or more finger sensors 310, so the number of the finger sensors 310 is not less than the number of the finger contact areas 122. The finger sensors 310 may sense that the finger touches, approaches or leaves from the finger contact areas 122, thereby outputting signals of finger movement having different contents. Each of the finger sensors 310 comprises one or a combination of a proximity sensing element, a capacitive touch-sensing element, a resistive touch-sensing element, an inductive touch-sensing element, a pressure sensing element, and an optical touch-sensing element. This embodiment takes a proximity sensing element using infrared rays as an example. Moreover, the finger sensors 310 may also sense a pressing force of a finger, thereby outputting a signal of finger movement that includes force information.

The griping portion 120 optionally comprises a receiving area 124 and a lid 126, the receiving area 124 may be a groove, the finger sensors 310 may be disposed in the receiving area 124, and the lid 126 is disposed on the receiving area 124 to cover the receiving area 124 and the finger sensors 310. The property and structure of the lid 126 also vary depending on the type of the finger sensors 310. For example, when the finger sensor 310 is a proximity sensing element, the lid 126 may be non-opaque (may be semi-transparent) so as not to block infrared rays. For example, when the finger sensor 310 is a capacitive touch-sensing element, the lid 126 may be a part (a sensing layer) of the capacitive touch-sensing element. Through the arrangement of the lid 126, the controller 10 may have a clean and smooth appearance, but it is not limited thereto. Additionally, the lid 126 may also be provided with a plurality of openings (not shown) depending on technical characteristics of the finger sensors 310, and the finger sensors 310 may be partially received in the openings (i.e., partially protruding outside the openings). In other words, the positions of the openings correspond to the positions of the finger sensors 310 so that the finger sensors 310 can sense movement of the fingers through the openings. Accordingly, in some operations, the finger sensors 310 may be touched by the fingers to directly detect the movement of the fingers and generate corresponding signals.

Figure 1B:
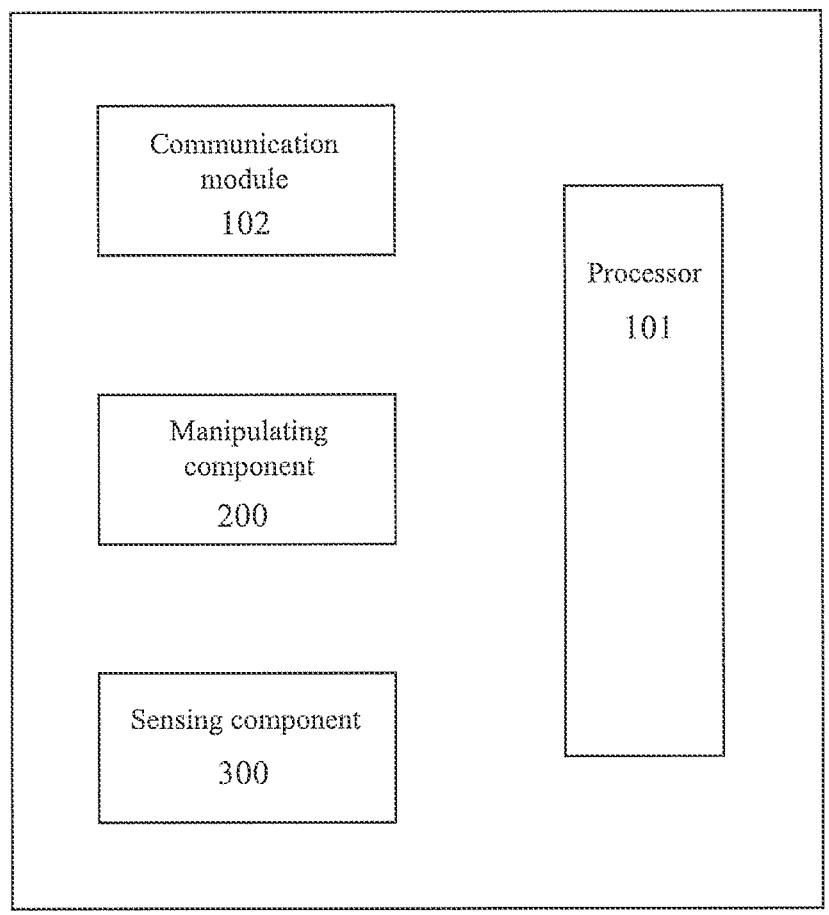
FIG. 1B is a schematic view of the controller according to the first preferred embodiment of the present invention.

Referring to FIG. 1B, the griping body 100 may further comprise a processor 101 and a communication module 102, both of which may be disposed in the housing of the head portion 110 and/or the griping portion 120. The processor 101 may be electrically connected with the manipulating component 200 and the sensing component 300 and is configured to control the operation of the manipulating component 200 and the sensing component 300 and process signals generated by the manipulating component 200 and the sensing component 300. The processor 101 may be a central processing unit (CPU), a microprocessor or other processors known in the art. The communication module 102 is also electrically connected to the processor 101 and is configured to transmit signals generated by the manipulating component 200 and the sensing component 300 to an external VR providing device in a wired or wireless way. If the signals are transmitted in a wireless way, the communication module 102 may be an infrared communication module, a wireless radio frequency (RF) communication module, a GPRS/CDMA communication module, a Wi-Fi communication module or other communication modules known in the art.

Figure 2:
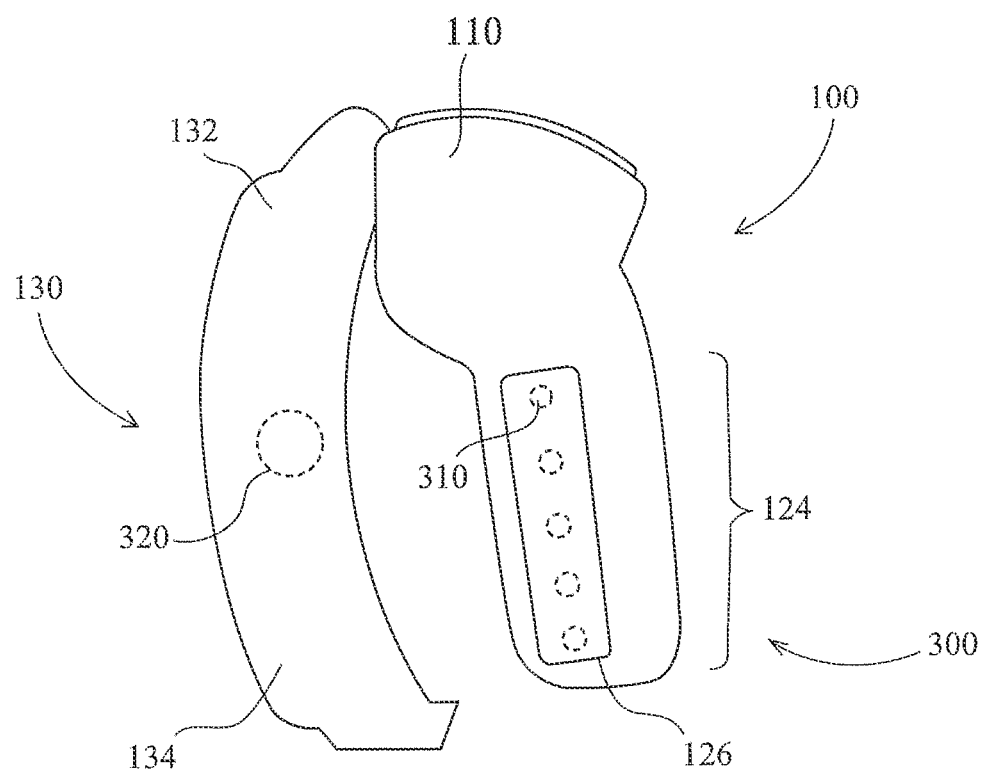
FIG. 2 is a schematic view of the controller of FIG. 1 comprising an attaching portion.

Referring to FIG. 2, structurally, the griping body 100 may further optionally comprise an attaching portion 130 which includes a top end 132 and a bottom end 134 disposed opposite to the top end 132, wherein the top end 132 may be connected and fixed to the head portion 110, but the bottom end 134 is not connected to the griping portion 120. Alternatively, the top end 132 may not be connected to the head portion 110, but the bottom end 134 is connected to the griping portion 120. When the hand of the user passes through the controller 10, the palm of the user is between the attaching portion 130 and the griping portion 120, and the first web of the hand of the user is sandwiched by the attaching portion 130 and the griping portion 120. In this way, even if the griping portion 120 or the head portion 110 is not griped by the thumb and the index finger of the user, and the griping portion 120 is not griped by the remaining three fingers, the griping body 100 is unlikely to fall off the palm as a whole. Accordingly, all fingers of the user can move relative to the griping body 100 to make various finger gestures.

Figure 3:
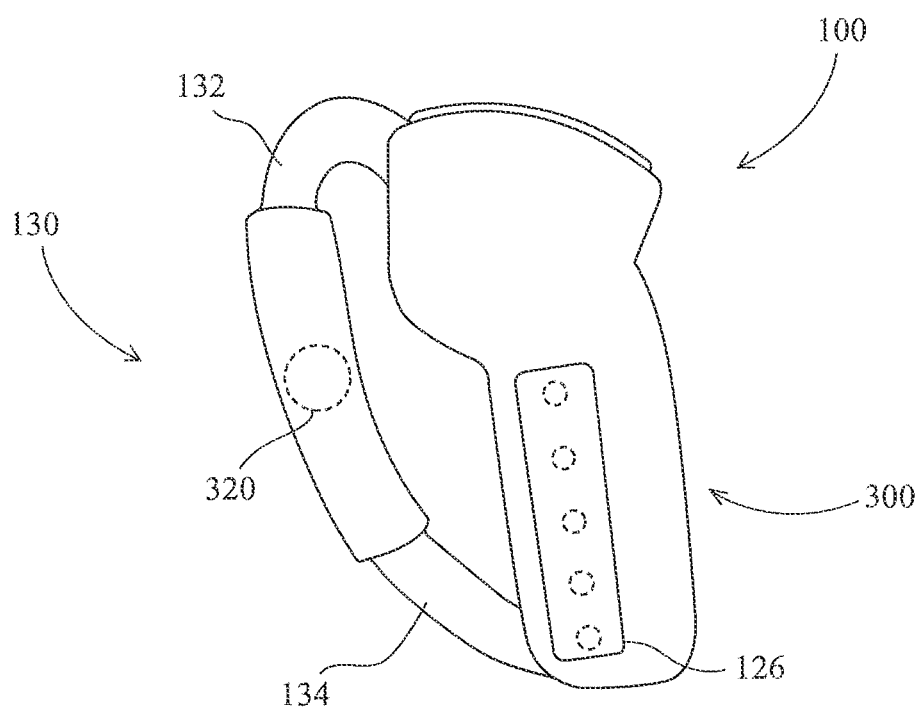
FIG. 3 is a schematic view of the controller of FIG. 1 comprising another attaching portion.

Referring to FIG. 3, in another implementation, the top end 132 and the bottom end 134 of the attaching portion 130 are respectively connected to the head portion 110 and the griping portion 120, so the griping body 100 may be hung on the first web of the hand of the user and the griping body 100 is less likely to fall off the hand of the user. The attaching portion 130 may be made of a hard or soft material depending on usage requirements. For example, the attaching portion 130 is provided as a ring belt of which the tightness is adjustable to suit users with hands of different sizes.

Moreover, the sensing component 300 may further comprise a vital sensor 320 which is disposed on the attaching portion 130 so as to monitor vital data such as the pulse and the body temperature of the user by sensing the back of the hand of the user when the user is griping the griping body 100, and then the vital data is transmitted to the VR providing device. Accordingly, the vital responses of the user can also be reflected in the virtual reality in real time, thereby improving the entertainment of the operation.

Figure 4:
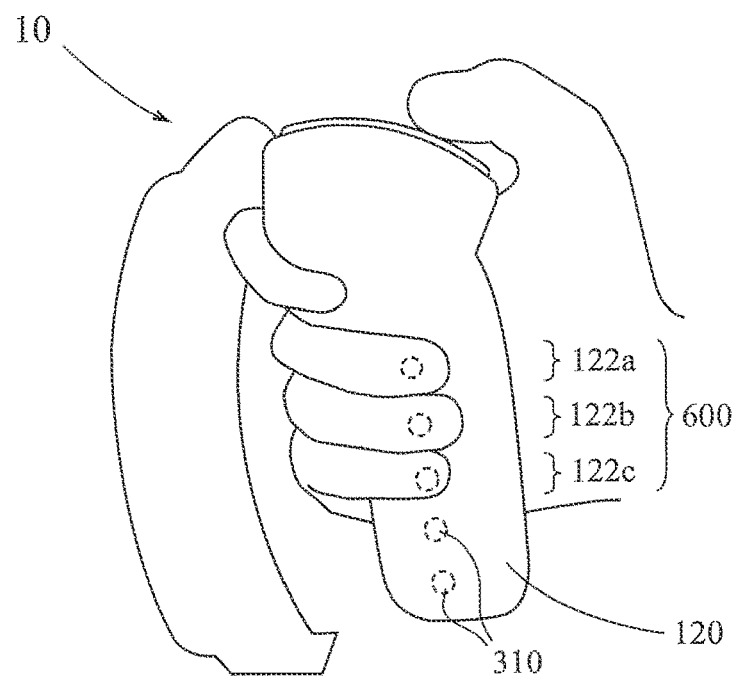
FIG. 4 to FIG. 6 are schematic views respectively illustrating the controller of FIG. 2 being griped by users with hands of different sizes.
Figure 5:
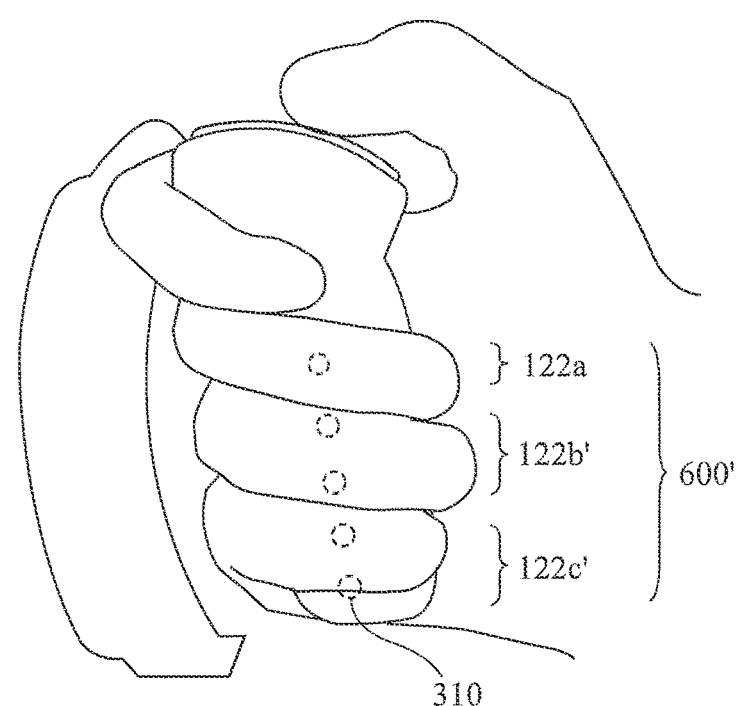
Figure 6:
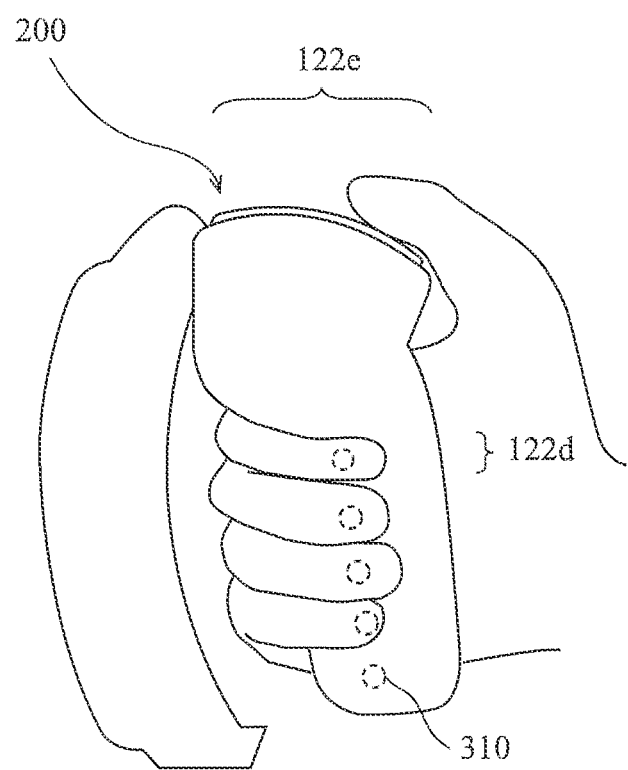

Referring to FIG. 4 to FIG. 6, technical contents of the finger contact areas 122 and the finger sensors 310 will be further described hereinafter. As shown in FIG. 4, if the griping body 100 is griped by a user with a hand of a smaller size, the middle finger, the ring finger and the little finger of the user touch the finger contact areas 122 defined by the griping portion 120 which comprise a middle finger contact area 122a, a ring finger contact area 122b and a little finger contact area 122c. Because the fingers and/or the palm are narrower, the middle finger contact area 122a, the ring finger contact area 122b and the little finger contact area 122c are accordingly smaller, each of which corresponds to one finger sensor 310.

As shown in FIG. 5, if the griping body 100 is griped by a user with a hand of a larger size, the middle finger, the ring finger and the little finger of the user touch the finger contact areas 122 defined by the griping portion 120 which comprise a middle finger contact area 122a, a ring finger contact area 122b' and a little finger contact area 122c'. Because the fingers and/or the palm are wider, the middle finger contact area 122a, the ring finger contact area 122b' and the little finger contact area 122c' are accordingly larger, each of which may correspond to more than one or two finger sensors 310.

As can be known from the above descriptions, the controller 10 may dynamically define the positions of the finger contact areas 122 and/or the corresponding finger sensors 310 depending on different sizes of the hands of the users. On the other hand, sensing ranges of finger sensors 310 in two adjacent finger contact areas 122 may not overlap with each other, but the same finger may be defined respectively by the adjacent finger sensors 310. Therefore, the sensing range of each of the finger sensors 310 is preferably smaller. Taking the case where the finger sensor 310 is an infrared proximity sensing element as an example, the sensing range of the finger sensor 310 is preferably within ±10 degrees of the optical axis.

As shown in FIG. 6, if the movement of the index finger and/or the thumb of the user also needs to be sensed, then the finger contact areas 122 may further define an index finger contact area 122d and/or a thumb contact area 122e correspondingly. The index finger contact area 122d is comprised in the griping portion 120, while the thumb contact area 122e is comprised in the head portion 110. However, the head portion 110 may also comprise another index contact area (not shown). Depending on the sizes of the fingers, each of the index finger contact area 122d and the thumb contact area 122e may correspond to at least one or two finger sensors 310.

After the middle finger contact area 122a, the ring finger contact area 122b (122b'), the little finger contact area 122c (122c'), the index finger contact area 122d and the thumb finger contact area 122e have been defined according to different sizes of the hands, the finger sensors 310 within these contact areas may sense movement of the corresponding fingers (i.e., whether the fingers touch, approach or leave from the griping body 100).

Figure 7:
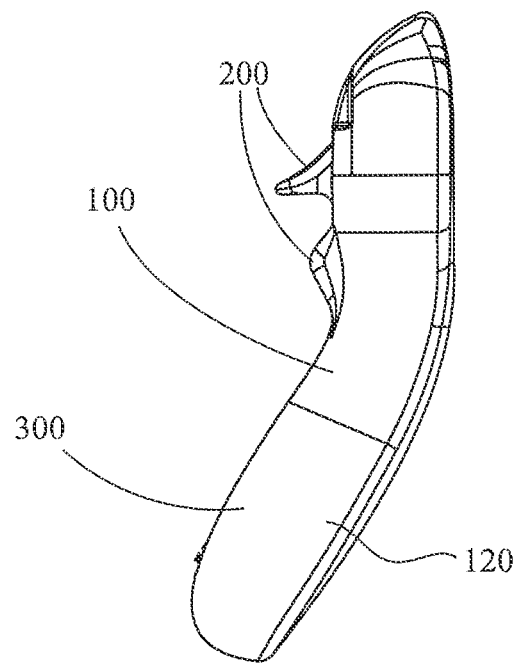
FIG. 7 and FIG. 8 are respectively a side view and a front view of a controller according to a second preferred embodiment of the present invention.
Figure 8:
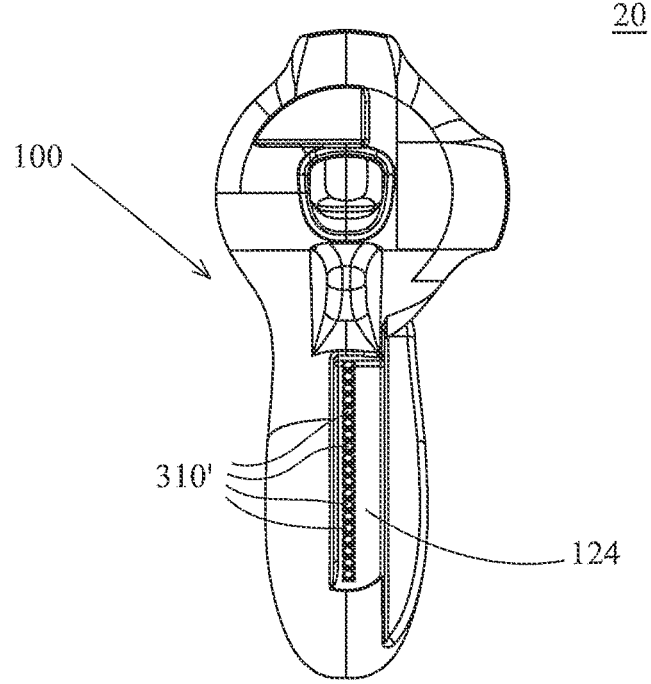

Please refer to FIG. 7 and FIG. 8, which are respectively a left-side view and a front view of a controller 20 according to a second preferred embodiment of the present invention. The controller 20 is generally similar to the controller 10, so reference may be made to the technical contents of the controller 10 for the technical contents of the controller 20, and vice versa. The controller 20 differs from the controller 10 in the contour of the griping body 100, and moreover, the manipulating component 200 of the controller 20 may be disposed on the griping portion 120, and the configuration and the number of the finger sensors 310' of the controller 20 are also different from those of the controller 10.

Figure 9:
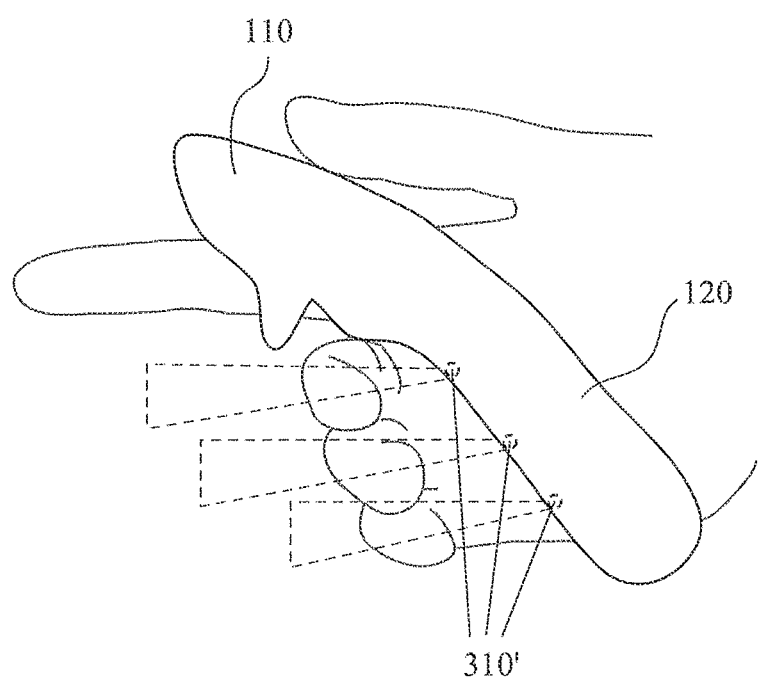
FIG. 9 is a schematic view of the controller of FIG. 7 being griped by a user.

More specifically, the sensing component 300 comprises a larger number of finger sensors 310', and these finger sensors 310' are arranged more densely. Referring to FIG. 9, when the user grips the controller 20, the movement of the finger thereof can be sensed by the finger sensor 310' no matter which place of the griping portion 120 is touched or approached by the finger, and the finger will not fail to be sensed because the finger is right placed between two finger sensors 310'.

What described above are technical contents of the controller for finger gesture recognition according to the preferred embodiments of the present invention, and a method for recognizing finger gesture according to another preferred embodiment of the present invention will be described hereinafter. The method for recognizing finger gesture may be implemented by the controller of the aforesaid preferred embodiments (or other controllers with the substantially same technical contents). Therefore, reference may be made to the technical contents of the controller for the technical contents of the method, and vice versa, and the repeated part therebetween will be omitted or simplified.

The method for recognizing finger gesture may be executed by a processor, e.g., executed by the processor 101 of the controller 10 itself (as shown in FIG. 1B), or the method may be executed by a processor (not shown) of an external device such as the VR providing device, or executed by two processors in combination. Steps of the method for recognizing finger gesture will be described more specifically by taking the controller 10 as an example.

Figure 10:
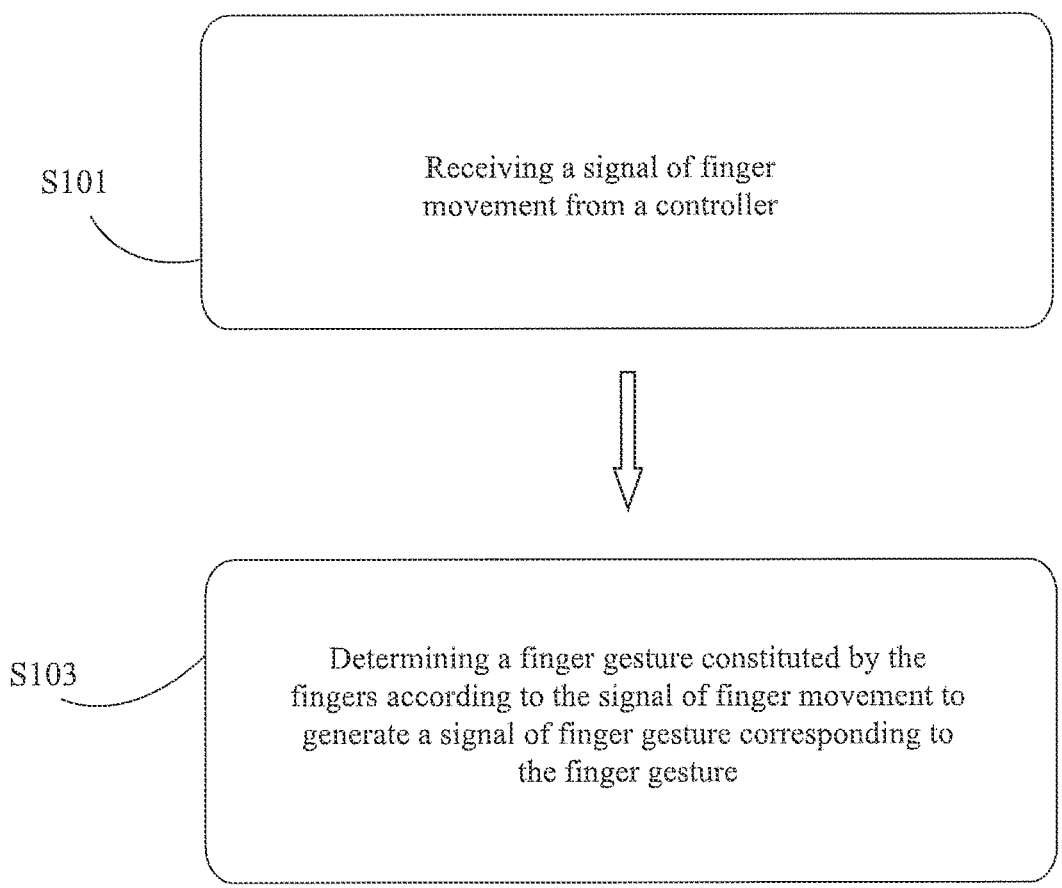
FIG. 10 is a flowchart diagram of steps of a method for recognizing finger gesture according to a preferred embodiment of the present invention.
Figure 11A:
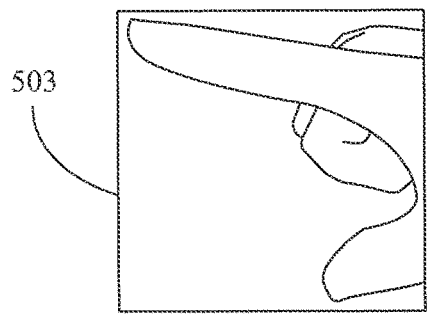
FIG. 11A to FIG. 11D are schematic views illustrating different finger gestures of users and images displayed by a VR providing device in response to the finger gestures.
Figure 11A:
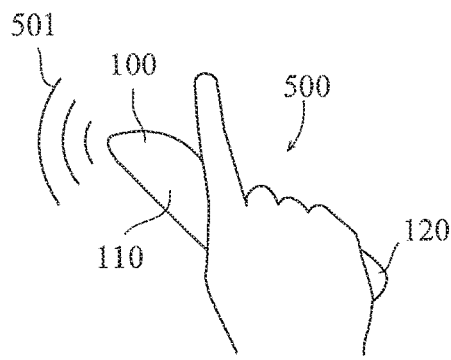
Figure 11B:
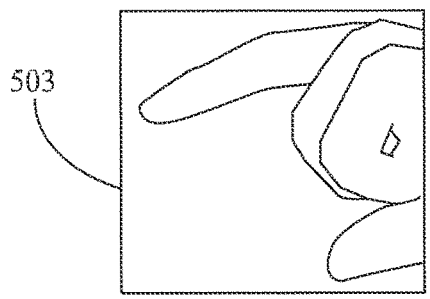
Figure 11B:
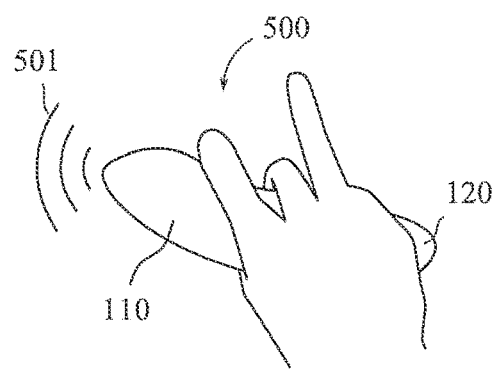
Figure 11C:
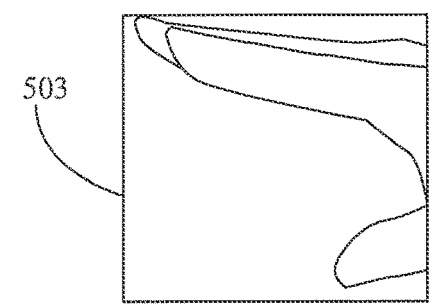
Figure 11C:
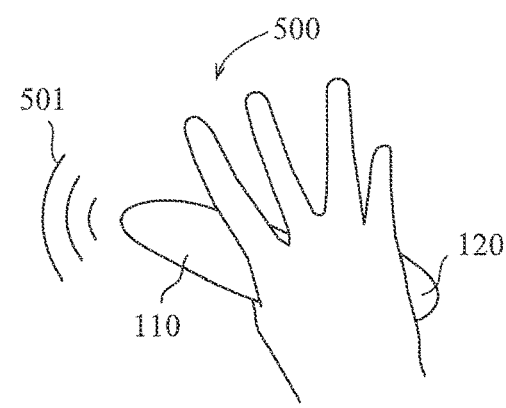
Figure 11D:
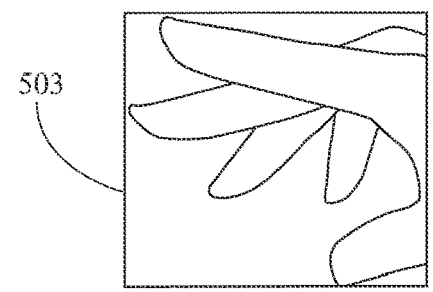
Figure 11D:
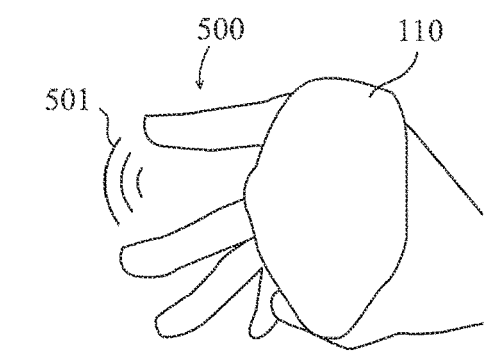

Referring to FIG. 10 and FIG. 1A, first step S101 is executed to receive a signal of finger movement from the controller 10 by the processor, wherein the signal of finger movement is generated by at least one of the finger sensors 310 sensing that at least one of fingers of a user touches or approaches the controller 10. Further speaking, when any finger of the user touches the griping body 100 of the controller 10, the finger sensor 310 in the corresponding finger contact area 122 generates a signal; and when the finger of the user approaches but not touches the griping body 100, the finger sensor 310 may also generate a signal. The contents of the signals are different depending on the distance between the finger and the griping body 100. Therefore, the signal of finger movement may comprise data or information such as whether the finger touches the griping body 100, the distance from the finger to the griping body 100 or the like.

Moreover, the signal of finger movement may also be generated by at least one of the finger sensors 310 sensing that the finger of the user leaves from the griping body 100 of the controller 10. Further speaking, when the finger of the user leaves from the griping body 100, the finger sensor 310 may also generate a signal of the corresponding content, by which the time when the finger touches the griping body 100 can be determined in subsequent steps.

The signal of finger movement may be defined to comprise a first signal, a second signal, and a third signal which are respectively generated by one or more of the finger sensors 310 sensing that one of a middle finger, a ring finger and a little finger of the user touches, approaches or leaves from the controller 10. For example, the finger sensor 310 in the middle finger contact area 122a (as shown in FIG. 4) may generate a first signal when it senses that the middle finger touches, approaches or leaves from the middle finger contact area 122a. If the movement of the index finger and/or the thumb is also sensed (as shown in FIG. 7), the signal of finger movement may be defined to further comprise a fourth signal and/or a fifth signal, the fourth signal is generated by one or more of the finger sensors 310 sensing that an index finger of the user touches, approaches or leaves from the controller 10, and the fifth signal is generated by one or more of the finger sensors 310 sensing that the thumb of the user touches, approaches or leaves from the controller 10.

Moreover, the user may make all of the middle finger, the ring finger and the little finger thereof touch the griping body 100, the middle finger, the ring finger and the little finger touch different positions of the griping body 100, and one or more finger sensors 310 at each of the positions generate a signal so that the middle finger contact area 122a, the ring finger contact area 122b (122b') and the little finger contact area 122c (122c') corresponding to the size of the hand of the user are defined, as shown in FIG. 4 or FIG. 5. The user may also make the index finger and/or the thumb thereof touch the griping body 100 to define the index finger contact area 122d and the thumb contact area 122e, as shown in FIG. 6.

Referring to FIG. 10 and FIG. 11A to FIG. 11D, then step S103 is executed to determine a finger gesture 500 constituted by the fingers according to the signal of finger movement being received to generate a signal 501 of finger gesture corresponding to the finger gesture 500. Further speaking, the signal of finger movement comprises data or information such as whether each of the fingers touches the griping body 100, the distance from each of the fingers to the griping body 100 or the like, the processor may determine the finger gesture 500 constituted by the fingers according to the data or information to generate the signal 501 of finger gesture corresponding to the finger gesture 500.

The VR providing device may receive and apply the signal 501 of finger gesture to enable a virtual role in the virtual reality or an video game to make various finger gestures such as grabbing, throwing and picking up, griping and releasing, hitting a ball, playing the piano, shooting, boxing, finger-guessing or the like, and the VR providing device may also display the corresponding finger gesture images 503 synchronously.

In other implementations, the method for recognizing finger gesture may further comprise the following step: defining, by the processor, a range of the controller that is touched by the fingers according to the signal of finger movement after the signal of finger movement is received by the processor. For example, as shown in FIG. 4, three finger sensors 310 among five finger sensors 310 in the griping portion 120 of the controller 10 sense the touch of the fingers when the hand of the user is smaller, so a range 600 may be defined to cover the three finger sensors 310. For example, as shown in FIG. 5, all of the five finger sensors 310 in the griping portion 120 sense the touch of the fingers when the hand of the user is larger, so a range 600' may be defined to cover the five finger sensors 310. The range 600 (600') may also be regarded as comprising the middle finger contact area 122a, the ring finger contact area 122b (122b') and the little finger contact area 122c (122c').

After the range 600 is defined, the method for recognizing finger gesture may further comprise: suspending operation of the finger sensors 310 outside of the range 600 (600'). That is, because the hand is smaller, the finger sensors 310 outside of the range 600 cannot be touched by the fingers (or is only touched by the fingers incidentally), and thus suspending operation of the finger sensors 310 outside of the range 600 (600') can save electrical energy and reduce errors in finger gesture determining operations.

Moreover, the method for recognizing finger gesture may further comprise: receiving a vital signal from the controller 10, wherein the vital signal is generated by the vital sensor 320 (as shown in FIG. 2 or FIG. 3) sensing a back of hand of the user.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A method for recognizing finger gesture, comprising:
receiving a signal of finger movement from a controller, wherein the controller includes a plurality of finger sensors, and the signal of finger movement is generated by at least one of the finger sensors sensing that at least one of fingers of a user touches or approaches the controller;
defining a range of the controller that is touched by the fingers according to the signal of finger movement, and suspending operation of the finger sensors outside of the range; and
determining a finger gesture constituted by the fingers according to the signal of finger movement to generate a signal of finger gesture corresponding to the finger gesture.

2. The method according to claim 1, further comprising: receiving a signal from a controller, wherein the signal is generated by the hand rotation and movement of a user.

3. The method according to claim 1, further comprising: transmitting the signal of finger gesture to an external VR providing device in a wired or wireless way.

4. The method according to claim 3, wherein the wireless way comprises an infrared communication way, a wireless radio frequency (RF) communication way, a GPRS/CDMA communication way, or a Wi-Fi communication way.

5. The method according to claim 3, wherein the external VR providing device enable a virtual role in the virtual reality or a video game to make various finger gestures such as grabbing, throwing and picking up, griping and releasing, hitting a ball, playing the piano, shooting, boxing, finger-guessing after receiving and applying the signal of finger gesture.

6. The method according to claim 1, wherein the signal of finger movement is generated by one of the finger sensors sensing that at least one of the fingers leaves from the controller.

7. The method according to claim 1, wherein the signal of finger movement comprises a first signal, a second signal, and a third signal which are respectively generated by one or more of the finger sensors sensing that one of a middle finger, a ring finger and a little finger of the fingers touches or approaches the controller.

8. The method according to claim 7, wherein the signal of finger movement comprises a fourth signal which is generated by one or more of the finger sensors sensing that an index finger of the fingers touches or approaches the controller.

9. The method according to claim 8, wherein the signal of finger movement comprises a fifth signal which is generated by one or more of the finger sensors sensing that a thumb of the fingers touches or approaches the controller.

10. The method according to claim 1, wherein the signal of finger movement is generated by a plurality of finger sensors sensing one of the fingers touches, approaches and/or leaves from the controller, wherein the plurality of finger sensors are arranged densely.

11. The method according to claim 1, wherein each of the finger sensors has a sensing range within ±10 degrees.

12. The method according to claim 1, wherein each of the finger sensors comprises a proximity sensing element, a pressure sensing element, a capacitive touch-sensing element, a resistive touch-sensing element, an inductive touch-sensing element or an optical touch-sensing element.

13. The method according to claim 1, further comprising: receiving a vital signal from the controller, wherein the controller comprises a vital sensor, the vital signal is generated by the vital sensor sensing a back of hand of the user.

* * * * *